United States Patent [19]
Marasco

[11] 3,871,040
[45] Mar. 18, 1975

[54] APPARATUS FOR HARVESTING FRUIT FROM TREES

[75] Inventor: Carmelo Marasco, Lecce, Italy

[73] Assignee: Ernesto Lendaro, Udine, Italy

[22] Filed: May 16, 1974

[21] Appl. No.: 470,652

[30] Foreign Application Priority Data
May 16, 1973 Italy .................................. 17104/73

[52] U.S. Cl. ............................................. 56/328 R
[51] Int. Cl. ............................................ A01g 19/00
[58] Field of Search ......... 56/328 R, 329, 12.8, 330, 56/30, 32

[56] References Cited
UNITED STATES PATENTS
3,757,504   9/1973   Rauth ............................... 56/328 R Primary Examiner—Robert Peshock
Assistant Examiner—J. N. Eskovitz

[57] ABSTRACT

Apparatus for harvesting fruit from trees by felling them with pulsating jets of compressed air and mechanically gathering them into heaps, which comprises a vertically mounted air tank-guide member to which is slidably attached a blower unit having nozzles at the extremity thereof, said tank being also in fluid communication with additional auxiliary equipment for individually investing the branches of the tree and for gathering the felled fruit.

8 Claims, 1 Drawing Figure

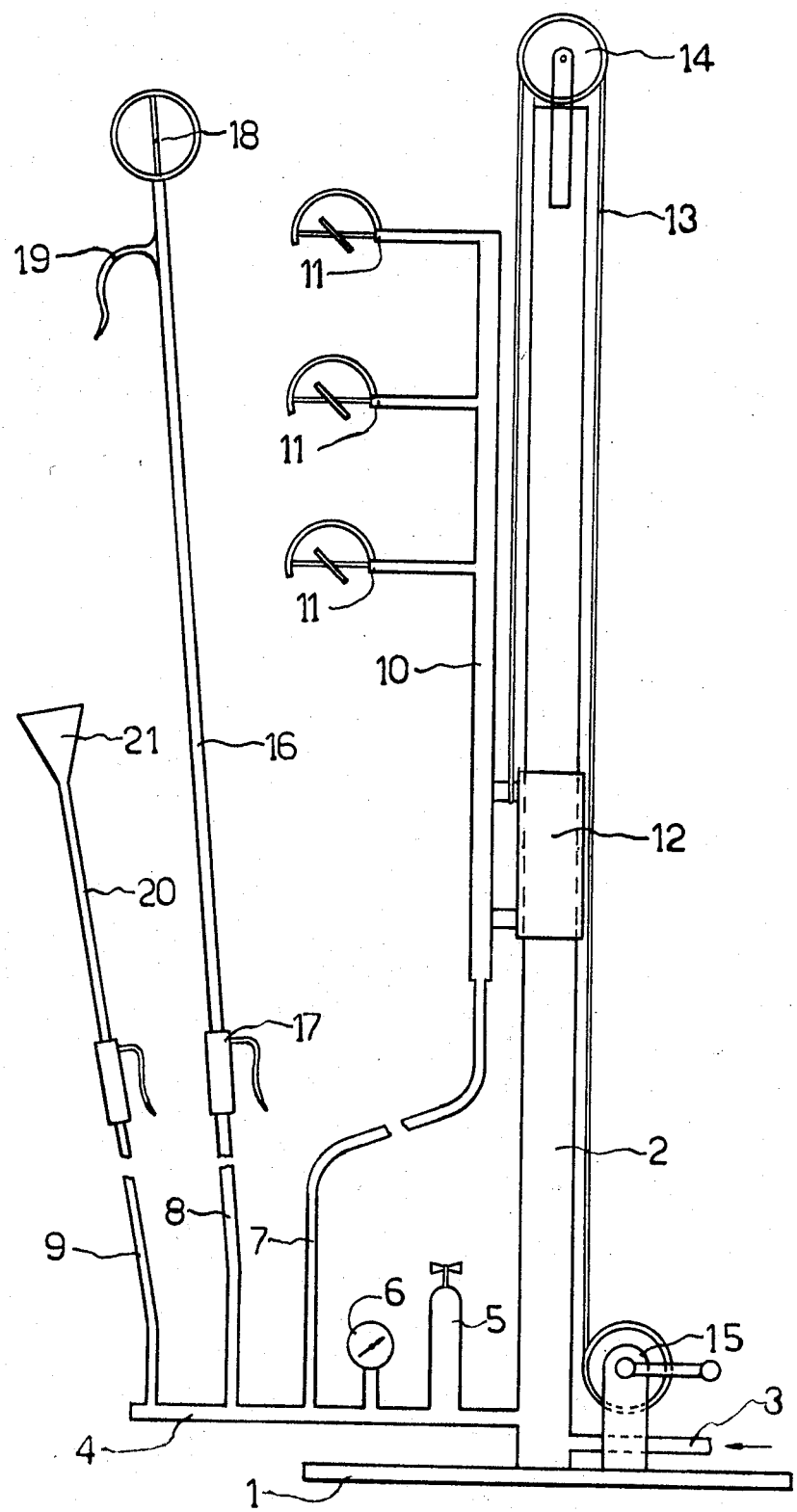

APPARATUS FOR HARVESTING FRUIT FROM TREES

BACKGROUND OF THE INVENTION

The present invention relates to an apparatus for harvesting fruit from trees, particularly fruit such as olives, almonds, walnuts, and the like, by causing the almost natural detachment thereof from the bearing tree.

Heretofore, two general kinds of devices have been employed for mechanically harvesting fruit, one being a device which operates directly against the tree trunk and the other being an apparatus which is applied against the foliage itself.

The first-mentioned type, in order to satisfactorily shake the tree trunk, requires a disproportionate force and, consequently, implies excessive capital investment in machinery and high operating costs. Furthermore, it presents the disadvantage of possible serious damage to the tree bark and tree trunk.

The second-mentioned type of device works by means of vibrations transmitted directly to each individual branch through individual combs or the like. It has the inherent disadvantage, however, of causing relative damage to both fruit and foliage and, furthermore, it requires a tedious and lengthy operation in reaching each individual branch, with the ensuant impossibility of achieving a full harvesting job.

Neither of the two conventional devices may be utilized also for gathering the fruit which has been felled to the ground, such operation being done usually manually or, at best, with a separate and different machine, such as a mechanical rake and the like.

SUMMARY OF THE INVENTION

The present invention overcomes the drawbacks of the prior art devices by providing an apparatus which is capable of both felling the fruit and gathering it once it has been felled. It operates by investing the tree foliage with compressed air jets exiting from baffled nozzles. It is thus possible to obtain high-frequency pulsating air jets which invest the fruit with a force sufficient to cause their natural detachment from the tree.

The pulsating air jet is the most natural and, consequently, the most rational approach to harvesting fruit without damaging either the product or the plant. It, furthermore, allows the investment of a wider foliage area in a more complete and rapid manner. It, finally, permits to utilization of auxiliary attachments, such as for example, fan-like devices for gathering mechanically and with ease the felled fruit even from difficult places, as it is the case with fruit which are half buried in the ground or fallen on rocky terrain.

THE DRAWING

These and other features of the present invention will become more apparent from the following detailed description of an embodiment thereof, with reference to the accompanying drawing in which the single FIGURE is a schematic representation of a typical harvesting apparatus, illustratively, but not limitatively showing the component parts of the machine of the invention.

DETAILED DESCRIPTION OF THE INVENTION

Referring now to the single accompanying FIGURE, the apparatus comprises a base plate support 1 suitable for mounting on a tractor or other moving carrier. Alternatively, the apparatus may be rigidly fixed directly onto the tractor bed or trailer bed attached thereto, without using base plates. A guide 2, preferably tubular in shape, is vertically mounted, such as by welding, onto plate 1, said guide constituting, if so desired, the holding tank for compressed air. As illustrated, the guide 2 serves therefore the dual purpose of lifting the harvesting tool and of holding a reservoir of compressed air, although the latter function may be accomplished by a separate tank. A conduit 3 connects the tubular guide 2 with an air compressor (not shown), which may be suitably mounted on the same vehicle or on a separate trailer. As illustrated, the compressed air is delivered from the air compressor to the holding tank-tubular guide 2. A second conduit 4 connects the guide 2 to a plurality of feed lines 7, 8, 9 (three being shown in the FIGURE), which will be described more fully later on. Conventional pressure reducer 5 and pressure gauge 6 are suitably interposed in conduit 4 between the tubular guide 2 and the first feed line 7.

Feed lines 7, 8, 9 deliver the compressed and pressure-reduced air to the three tools illustrated in the FIGURE. Line 7 feeds a blower unit 10 which is composed of at least one baffled nozzle 11 (three are shown) and is attached to the guide 2 by means of a sliding sleeve 12. The nozzles 11 are preferably provided with baffles of the butterfly-type which are well known in the art. The sleeve 12, and consequently the unit 10, is raised or lowered along guide 2 by any conventional means such as mechanically, hydraulically, by compressed air etc. As illustrated, the sleeve 12 is moved by means of a rope 13 which is operated by a winch 15 through a pulley 14. The blower unit 10 is thus enabled to reach different heights and to operate in different areas of the tree foliage. The delivery of compressed air to the blower unit may be controlled by means of a manually-operated valve like that shown at 17, or by utilizing the pressure reducer 5 directly or by having a shut-off cock in the feed line 7.

Feed line 8 delivers compressed air to a rigid conduit 16 which is provided with a manually-operated valve 17 to regulate the air flow, although equivalent devices may be used. Conduit 16 carries at its upper extremity one or more nozzles 18 (one is shown) which are protected with a similar butterfly-type baffle as discussed hereabove. The nozzle is, however, more fully protected against accidental penetration of small branches therein, since this tool operates not detached from the foliage but amidst it; in fact, it is hung on individual branches by means of a hook 19, which gives it support and stability.

Finally, line 9 feeds compressed air to still another rigid conduit 20, which is constructionally similar to conduit 16 except that the extremity is provided with one or more nozzles operating in fan-like fashion, so as to enable the easy mechanical gathering of the felled fruit. Since this tool is used on the ground, no hook attachment is required.

The operation of the apparatus of the present invention may be briefly described as follows: the operator approaches with the tractor the tree to be harvested, while the compressor introduces forced air into the tank-guide 2. By means of winch 15 the blower unit 12 is raised to the desired height so as to invest the foliage with maximum effect, and then nozzles 11 are actuated, while the nozzles are operative, the operator slowly circles the tree, so that the entire foliage is being treated. If the tree is very tall, the operation may be repeated after adjusting the height of the blower unit 10. Terminated this first operation, those branches which could not be previously reached and which still bear fruit are invested by means of the conduit 16. Finally, by means of conduit 20 the fruit are gathered into readily collectable heaps.

It can be readily seen that the present invention may be utilized even with modifications of the device above described. Thus, for example, the apparatus may be mounted together with the compressor on a separate trailer; or the nozzles may have different structural configuration, as long as pulsating or otherwise discontinuous jets of compressed air are delivered; or the shape and positions of the various feed lines and conduits may be altered. These and other changes and modifications are possible without, however, departing from the scope of the invention as hereinbefore described and hereinafter claimed.

What is claimed is:

1. Apparatus for harvesting fruit from trees by means of intermittent jets of compressed air, which comprises:
   a. a vertically positioned guide member;
   b. a blower unit supported by said guide member and slidably attached thereto for vertical displacement therealong;
   c. at least one nozzle positioned at the upper extremity of said blower unit for delivering compressed air pulsatingly against the foliage of the tree;
   d. means for raising and lowering said blower unit along said guide member;
   e. means for holding compressed air delivered by a compressor source;
   f. means for controlling the flow of compressed air to said blower unit;
   g. means connecting said holding means with said blower unit for fluid communication therebetween; and
   h. means for supporting said guide member in vertical position.

2. The apparatus according to claim 1, wherein said nozzle comprises a butterfly-type baffle for the intermittent delivery of air jets against the foliage of the tree.

3. The apparatus according to claim 1, wherein said blower unit has a plurality of nozzles and said raising and lowering means comprises a winch-operated mechanism including rope and pulley.

4. The apparatus according to claim 1, wherein said guide member is concurrently also the holding means for the compressed air.

5. The apparatus according to claim 1, further comprising a rigid conduit connected to said air holding means by means of a feed line and comprising pressure regulating means, at least one nozzle at the extremity of said conduit and means for supporting said rigid conduit on an individual tree branch, said nozzle having a baffle for delivery of pulsating air jets.

6. The apparatus according to claim 1, further comprising a rigid conduit connected to said air holding means by means of a feed line and comprising pressure regulating means and at least one nozzle at the extremity of said conduit constructed in the shape of a fan for gathering felled fruit into heaps.

7. The apparatus according to claim 5, further comprising a second rigid conduit separately connected to said air holding means by means of a feed line and comprising separate pressure regulating means and at least one nozzle at the extremity of said second conduit constructed in the shape of a fan for gathering felled fruit into heaps.

8. Apparatus for harvesting fruit from trees by means of intermittent jets of compressed air, which comprises:
   a. a tubular vertically positioned air holding tank;
   b. a blower unit supported by said tubular tank and slidably attached thereto for vertical displacement therealong;
   c. a plurality of spaced apart T-nozzles along the upper portion of said blower unit for delivering intermittent jets of air against the foliage of the tree;
   d. means for raising and lowering said blower unit along said holding tank;
   e. means for connecting said holding tank with said blower unit for delivery of compressed air thereto, said connecting means containing a pressure regulator therein;
   f. means for supporting said air holding tank in vertical position;
   g. a first rigid conduit in fluid communication with said holding tank and having a pressure regulator, means for supporting said conduit on a tree branch and at least one nozzle at the extremity of said conduit for delivering intermittent jets against the foliage of the tree; and
   h. a second rigid conduit in fluid communication with said holding tank and having a pressure regulator, and at least one fan-shaped nozzle at the extremity thereof for delivering jets of air against the felled fruit for gathering them into heaps.

* * * * *